UNITED STATES PATENT OFFICE.

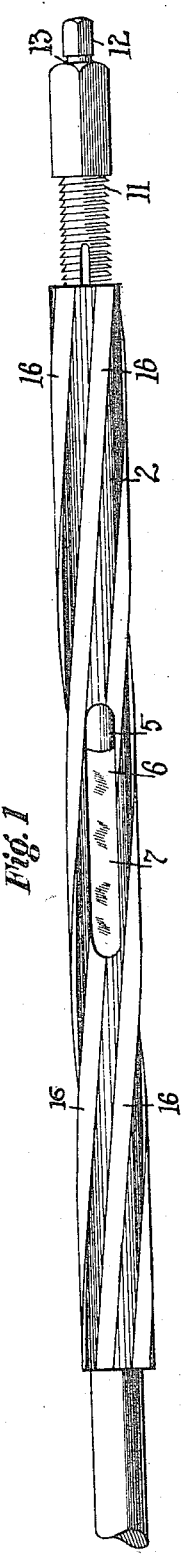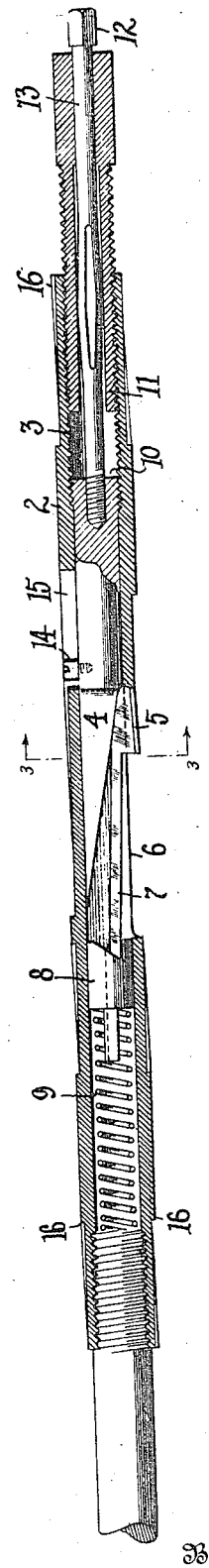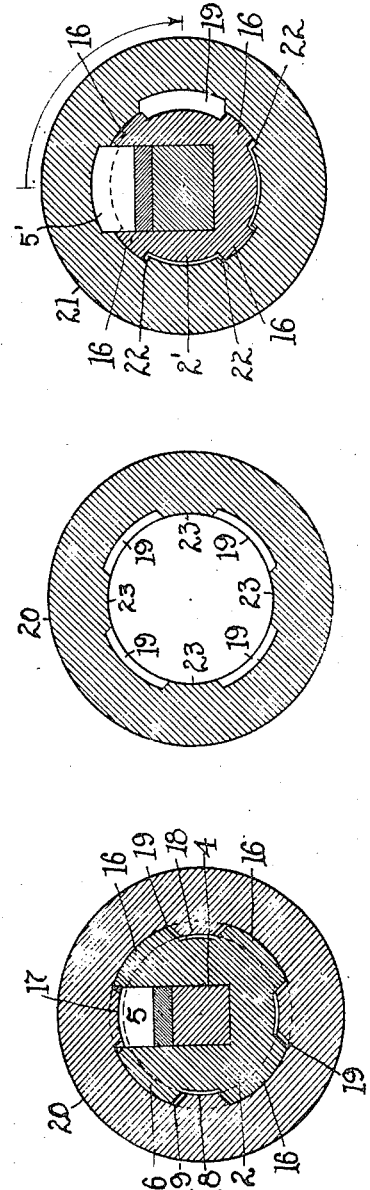

WILLIAM C. ANDREWS, OF CLEVELAND, OHIO, ASSIGNOR TO HARRY A. AUER, OF CLEVELAND, OHIO.

RIFLING TOOL OR HEAD FOR RIFLING-MACHINES.

1,294,750.  Specification of Letters Patent.   Patented Feb. 18, 1919.

Application filed February 19, 1917. Serial No. 149,583.

*To all whom it may concern:*

Be it known that I, WILLIAM C. ANDREWS, a citizen of the United States, residing at Cleveland, in the county of Cuyahoga and State of Ohio, have invented certain new and useful Improvements in Rifling Tools or Heads for Rifling-Machines, of which the following is a specification.

This invention relates to the manufacture of guns and ordnance, and more particularly to an improved form of rifling tool or head for a rifling machine, the object being to provide a tool which will operate in grooves or channels cut spirally in the bore of a gun, and act to center the tool constantly while cutting other spiral surfaces or grooves successively to a uniform depth, and in so doing produce a rifled bore of uniform caliber, smooth finish, long life and high efficiency.

In the accompanying drawings, Figure 1 is a side view of my improved rifling machine tool or head. Fig. 2 is a sectional view longitudinally through the tool. Fig. 3 is an enlarged view showing a cross section of the tool centered in a series of radial grooves formed in a gun barrel with the hook cutter of the tool cutting down the land surface between two such grooves. Fig. 4 is a cross section, on an enlarged scale, of a rifled gun barrel; and in Fig. 5 the relative proportions of the body and cutter are shown changed to permit an alternative method of rifling to be practised.

As shown, the invention comprises a tool or head made in the form of a cylindrical body 2 having a central bore 3 within which an adjustable wedge member 4 is slidably confined. A hook cutter 5 bears against the tapering end of wedge member 4, and its cutting edge projects through a side slot 6 in body 2, while the end of its spring stem 7 is seated in the notched end face of a plunger 8 which is backed by a coiled spring 9 confined within bore 3. Wedge member 4 has a longitudinal movement within the bore which is limited in one direction by the end shoulder 10 on the wedge member striking the inner end of a screw plug 11, and limited in the other direction by the enlargement 12 on the stem 13 of member 4 engaging the squared outer end of the plug. In operation, the stem enlargement 12 provides the engaging means for moving the wedge member inward to expand the cutter; screw plug 11 adjustably controls the extent of movement of the wedge member and degree of expansion of the cutter; and a screw or projection 14 at one side of the wedge member extends through a slot 15 in the side of the body to retire the wedge member and permit cutter 5 to collapse or move inward upon return movements of the tool or head through the gun barrel.

In producing a rifled gun barrel according to a method of my own invention as set forth in my application for Letters Patent filed February 12, 1917, Serial Number 148,259, a series of equi-distant radial channels or grooves are cut spirally to a uniform depth within a gun barrel by reciprocating and rotating a suitable tool through the barrel, these operations being completed, similar cutting actions take place over the bore surfaces between the adjacent grooves but to a different depth, using a second draw cutting tool such as herein described. It is essential, however, that this second cutting tool be guided in its travel on the true axis of the bore as defined by the first cutting operations in order that the land surfaces and the bottom of the rifling grooves be concentric and especially that the depth of the grooves and the height of all the lands be uniform. Wherefore, I provide the body 2 with a series of radial ribs 16 extending spirally about the outside of the body, and the lead or pitch of these spiral ribs correspond exactly with the spiral channels or grooves produced originally in the gun barrel, and their width is approximately the same but may be considerably less than the channels or grooves, and the diameter of the body measured across the ribs is approximately the same as the diameter of the bore measured across from bottom to bottom of the channels or grooves cut in the bore surface by the first series of cutting operations. In this way the spirally ribbed body 2 fits snugly within the channeled bore with the ribs 16 extending into the channels in bearing engagement with the bottoms thereof, and the tool is held absolutely central and cannot move laterally but must travel on the identical axis traveled by the first tool. The position of the hook cutter 5 is also important in that its cutting edge 17 must bridge or extend across the gap between two ribs 16 so as to cut or plane the uncut bore surface 18 between two of the channels or grooves 19 in the bore surface of the gun barrel 20, and cutting of this surface 18 is produced by repeated movements of the tool through the gun bore until the desired depth of cut is obtained. The radial ribs 16 are shown as extending the full length of the tool body and while the preferable arrangement it is not obsolutely essential and may be modified and an equivalent centering guide substituted, provided that it be adapted to travel in the spiral channels of the bore and perform the same function.

In Fig. 5 I show a gun barrel 21 having radial channels 22 of narrower width than the channels or grooves 19 in the barrel 20 shown in Fig. 3, and the diameter of the bore measured across from the bottom of the channels in less in Fig. 5 than in Fig. 3. The cutter 5' in Fig. 5 is also wider than the cutter 5 in Fig. 3, and arranged to cut deeper into the gun barrel, but the tool 2' is otherwise the same as tool 2 as herein described. Fig. 4 shows a finished gun barrel, such as either tool is adapted to finish, the channels 19 representing the rifling grooves, and the intervening portions 23 representing the lands, and while four rifling grooves are shown within the barrel and a corresponding number of ribs 16 are used, the number of grooves and the number of ribs employed may vary. Either a scrape or hook cutter may be used.

What I claim is:

1. In a rifling tool, a cylindrical body having radial ribs extending spirally thereon, a hook cutter projected through the side of said body, and adjustable means to expand said cutter.

2. In a rifling tool, a cylindrical body having spiral ribs extending radially therefrom, a hook cutter having a cutting edge transversely disposed between two of said ribs, and operating means for said cutter internally of said body.

3. In a rifling tool, a hollow cylindrical body, having a side slot and provided with a series of radial centering guides externally, a cutter in said slot, an expanding member for said cutter, and means to adjustably control the movements of said expanding member.

4. A tool adapted to be used in a gun rifling machine, comprising a cylindrical body having a series of ribs extending spirally therearound uniform distances from the axis, an expanding cutter radially mounted in the side of said body with a cutting edge transversely bridging the space between two of said ribs, and means to expand said cutter in variable degree.

5. A rifling tool adapted for use in rifling machines, and which is provided with radial centering ribs or their equivalent extending spirally about the cylindrical body of the tool so as to travel in the spiral channels cut in a gun bore and which tool is further provided with one or more cutters located relatively to such ribs that cutting may proceed on the spiral surfaces between the spiral channels.

Signed at Cleveland, in the county of Cuyahoga, and State of Ohio, this 8th day of February, 1917.

WILLIAM C. ANDREWS.

Witnesses:
 KATHERINE T. FULLER,
 WM. N. ROSENZWSIG.